United States Patent

[11] 3,627,757

| [72] | Inventor | Taichiro Komeno |
| --- | --- | --- |
| | | Osaka-shi, Japan |
| [21] | Appl. No. | 786,728 |
| [22] | Filed | Dec. 24, 1968 |
| [45] | Patented | Dec. 14, 1971 |
| [73] | Assignee | Shionogi & Co., Ltd. |
| | | Osaka, Japan |
| [32] | Priority | Apr. 3, 1962 |
| [33] | | Japan |
| [31] | | 37/13418 |
| | | Continuation-in-part of application Ser. No. 610,825, Jan. 23, 1967, now abandoned, which is a division of application Ser. No. 335,662, Jan. 3, 1964, now Patent No. 3,300,485, which is a continuation-in-part of application Ser. No. 269,899, Apr. 2, 1963, now abandoned. This application Dec. 24, 1968, Ser. No. 786,728 |

[54] 6-ALKANOYLTHIO-4-EN-3-OXO STEROIDS AND PROCESS FOR PRODUCTION THEREOF
15 Claims, No Drawings

[52] U.S. Cl.................................................. 260/239.55D,
260/239.57, 260/397.2, 260/397.3,
260/397.4, 260/397.45, 260/397.47
[51] Int. Cl...................................................... C07c 173/00,
C07c 169/20
[50] Field of Search.......................................... /Machine
Searched Steroids

[56] References Cited
OTHER REFERENCES
Chem Abstracts (1964) Vol. 61, Par. 10,749 relied on.

*Primary Examiner*—Elbert L. Roberts
*Attorney*—Wenderoth, Lind & Ponack

ABSTRACT: Hormonal 6ϵ-lower alkanoylthio-3-oxo-4-en-steroids are prepared from corresponding 6ϵ-halo-3-oxo-delta-4-steroids and 6ϵ-lower alkanoylthio-5-hydroxy-3-oxo-steroids. They are also useful as intermediates for synthesis of hormonal thieno-[4',3',2'-4,5,6,]steroids which have been disclosed in U.S. Pat. No. 3,300,485.

6-ALKANOYLTHIO-4-EN-3-OXO STEROIDS AND PROCESS FOR PRODUCTION THEREOF

The present application is a continuation-in-part of application Ser. No. 610,825, filed Jan. 23, 1967, now abandoned, which application is a division of application Ser. No. 335,662, filed Jan. 3, 1964, now U.S. Pat. No. 3,300,485 which application is a continuation-in-part of application Ser. No. 269,899, filed Apr. 2, 1963, now abandoned.

The present invention relates to a novel process for preparing 6ε-lower alkanoylthio-4-en-3-one steroids and the novel products thereof, which are useful as medicinals and as important intermediates for preparing useful novel hormones such as thieno[4', 3', 2'-4,5,6]steroids as stated in our U.S. Pat. No. 3,300,485.

The object of the present invention is to provide a novel 6ε-lower alkanoylthio-4-en-3-one steroids. Another object of this invention is to provide a process for preparing them. The other object is to provide a useful medicine. The other object is to provide a convenient intermediates for production of useful thieno[4', 3', 2'-4,5,6]steroids. These and other objects of the present invention will be apparent from the descriptions hereinafter presented.

The compounds of the present invention are 4-en-3-one steroids bearing a 6ε-lower alkanoylthio substituent, represented by the partial formula:

wherein Ac represents a lower alkanoyl group, which represents positions 3, 4, 5, 6 and 7 of the steroid molecule, especially of the androstane, estrane, pregnane and cholestane series. Various substituents such as hydroxyl, acyloxy, ether, oxo, formyl, ester, carboxyl, lactones, lower alkyl, lower alkenyl, lower alkynyl, amino, substituted amino, double bond, and the like may be present in the steroid skeleton and/or the side chain.

Of the compounds of the invention, those represented by the following formula:

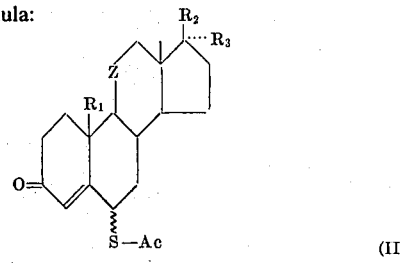

wherein Ac represents a lower alkanoyl group; $R_1$ is hydrogen or methyl group; $R_2$ is hydroxyl group, OAc group or a 17-side chain of the pregnane or cholestane series, and $R_3$ is hydrogen atom, hydroxyl group or ethynyl group; or when combined together, $R_2$ and $R_3$ represent an oxygen atom; Z is methylene group or carbonyl group, are important. Examples of acyl group represented by Ac include formyl, acetyl, propionyl, butyryl, isobutyryl, valeryl, isovaleryl, caproyl, tert-butylacetyl, cyclopentane-carbonyl, cyclohexanecarbonyl, enanthoyl, octanoyl, capryl, decanoyl, undecanoyl, lauryl, etc. A few example of the compounds of this invention includes: 6α-acetylthio-4-androstene-3,17-dione, 6β-acetylthio-4-androstene-3,17-dione, 6α- and 6β-propionylthio-4-androstene-3,17-dione, 6α- and 6β-butyrylthio-4-androstene-3,17-diones, 6α- and 6β-valerylthio-4-androstene-3,17-diones, 6α- and 6β-caproylthio-4-androstene-3,17-diones, 6α-acetylthio-17β-acetyloxy-4-androsten-3-one, 6β-acetylthio-17 β-acetyloxy-4-androsten-3-one, 6α- and 6β-propionylthio-17β-acetyloxy-4-androsten-3-ones, 6α- and 6β-propionylthio-17β-propionyloxy-4-androsten-3-ones, 6α- and 6β-acetylthio-17β-hydroxy-4-androsten-3-ones and 6β-acetylthio-4,16-androstadien-3-one, 6α- and 6β-propionylthio-17β-hydroxy-4-androsten-3-ones and 6α- and 6β-butyrylthio-17β-hydroxy-4-androsten-3-ones, 6α- and 6β-caproylthio-17β-hydroxy-4-androsten-3-ones, 6α- and 6β-acetyloxy-4-estren-3-ones, 6α- and 6β-butyrylthio-17β-acetyloxy-4-estren-3-ones, 6α- and 6β-valerylthio-17β-acetyloxy-4-estren-3-ones, 6α- and 6β-acetylthio-17β-valeryloxy-4-estren-3-ones, 6α- and 6β-acetylthio-17β-hydroxy-4-estren-3-ones and 6β-acetylthio-4,16-estradien-3-one, 6α- and 6β-propionylthio-17β-hydroxy-4-estren-3-ones, 6α- and 6β-acetylthio-17β-acetyloxy-17α-ethynyl-4-estren-3-ones, 6α- and 6β-propionylthio-17β-acetyloxy-17α-ethynyl-4-estren-3-ones, 6α- and 6β-propionylthio-17β-propionyloxy-17α-ethynyl-4-estren-3-ones, 6α- and 6β-acetylthio-17β-caproyloxy-17α-ethynyl-4-estren-3-ones, 6α- and 6β-acetylthio-17β-hydroxy-17α-ethynyl-4-estren-3-ones, 6α- and 6β-propionylthio-17β-hydroxy-17α-ethynyl-4-estren-3-ones, 6α- and 6β-acetylthio-4-pregnene-3,20-diones, 6α- and 6β-butyrylthio-4-pregnene-3,20-diones, 6α- and 6β-acetylthio-17α-hydroxy-4-pregnene-3,20-diones and 6β-acetylthio-4,16-pregnadiene-3,20-dione, 6α- and 6β-propionylthio-17α-hydroxy-4-pregnene-3,20-diones, 6α- and 6β-valerylthio-17α-hydroxy-4-pregnene-3,20-diones, 6α- and 6β-formylthio-4-cholesten-3-ones, 6α- and 6β-acetylthio-4-cholesten-3-ones, 6α- and 6β-propionylthio-4-cholesten-3-ones, 6α- and 6β-butyrylthio-4-cholesten-3-ones, 6α- and 6β-valerylthio-4-cholesten-3-ones, 6α- and 6β-caproylthio-4-cholesten-3-ones, 6α- and 6β-acetylthio-17 α,21-dihydroxy-4-pregnene-3,20-diones and ester and/or acetal derivatives thereof, 6α- and 6β-propionylthio-17α,21-dihydroxy-4-pregnene-3,20-diones and ester and/or acetal derivatives thereof, 6α- and 6β-acetylthio-17α,21-dihydroxy-4-pregnene-3,11,20-trione and ester and/or acetal derivatives thereof, 6α- and 6β-propionylthio-17α,21-dihydroxy-4-pregnene-3,11,20-trione and ester and/or acetal derivatives thereof and the like.

A process of the present invention comprises dehydration of 5α-hydroxy-3-oxo steroid bearing an 6ε-lower alkanoylthio substituent, represented by the partial formula:

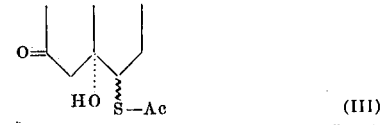

wherein Ac represents the same significances as defined above, for the positions 3, 4, 5, 6 and 7 of the steroid molecule, especially of the androstane, estrane, pregnane and cholestane series. Various substituents such as hydroxyl, acyloxy, ether, oxo, formyl, ester, carboxyl, lactones, lower alkyl, lower alkenyl, lower alkynyl, amino, substituted amino, double bond and the like may be present in the steroid skeleton and/or the side chain. A few of them may be changed in the reaction course, but they may be protected or recovered by the conventional manner in the art. Important starting materials are illustrated by the following formula:

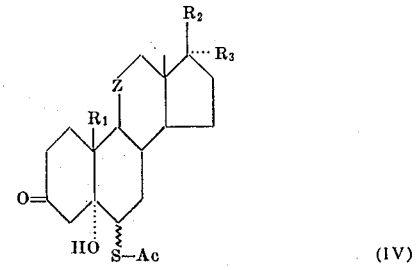

wherein Ac represents a lower alkanoyl group; $R_1$ is hydrogen atom or methyl group; $R_2$ is hydroxyl group, OAc group or a 17-side chain of pregnane or cholestane series; $R_3$ represents hydrogen atom, hydroxyl group or ethynyl group; or when combined together, $R_2$ and $R_3$ represent an oxygen atom; Z is methylene or carbonyl group. Specific examples of the starting materials are: 5α-hydroxy-6β-acetylthioandrostane-3,17-dione, 5α-hydroxy-6β-propionylthioandrostane-3,17-dione, 5α-hydroxy-6β-butyrylthioandrostane-3,17-dione, 5α-hydroxy-6β-valerylthioandrostane-3,17-dione, 5α-hydroxy-6β-caproylthioandrostane-3,17-dione, 5α-hydroxy-6β-acetylthio- 17β-acetyloxyandrostan-3-one, 5α-hydroxy-6β-propionylthio-17β-acetyloxyandrostan-3-one, 5α-hydroxy-6β-propionylthio-17β-propionyloxyandrostan-3-one, 5α,17β-dihydroxy-6β-acetylthioandrostan-3-one, 5α,17β-dihydroxy-6β-propionylthioandrostan-3-one, 5α,17β-dihydroxy-6β-butyrylthioandrostan-3-one, 5α,17β-dihydroxy-6β-caproylthioandrostan-3-one, 5α-hydroxy-6β-acetylthio-17β-acetyloxyestran-3-one, 5α-hydroxy-6β-butyrylthio-17β-acetyloxyestran-3-one, 5α-hydroxy-6β-valerylthio-17β-acetyloxyestran-3-one, 5α-hydroxy-6β-acetylthio-17β-acetyloxy-17α-ethynylestran-3-one, 5α-hydroxy-6β-propionylthio-17β-acetyloxy-17α-ethynylestran-3-one, 5α-hydroxy-6β-propionylthio-17β-propionyloxy-17α-ethynylestran-3-one, 5α,17β-dihydroxy-6β-acetylthio-17α-ethynylestran-3-one, 5α,17β-dihydroxy-6β-propionylthio-17α-ethynylestran-3-one, 5α-hydroxy-6β-acetylthiopregnane-3,20-dione, 5α-hydroxy-6β-propionylthiopregnane-3,20-dione, 5α-hydroxy-6β-butyrylthiopregnane-3,20-dione, 5α,17α-dihydroxy-6β-acetylthiopregnane-3,20-dione, 5α,17α-dihydroxy-6β-propionylthiopregnane-3,20-dione, 5α,17α-dihydroxy-6β-valerylthiopregnane-3,20-dione, 5α-hydroxy-6β-acetylthiocholestan-3-one, 5α-hydroxy-6β-propionylthiocholestan-3-one, 5α-hydroxy-6β-butyrylthiocholestan-3-one, 5α-hydroxy-6β-valerylthiocholestan-3-one and 5α-hydroxy-6β-caproylthiocholestan-3-one. These starting materials, 5α-hydroxy-3-oxo steroids bearing a 6ε-lower alkanoylthiosubstituent may be prepared from the corresponding 4-en-3-one steroids successively through the intermediates, 5-en-3-ketal steroids and 5α,6α-epoxy-3-one steroids by successive treatment with an alcohol such as ethylene glycol in the presence of an acid, a peroxide such as monoperphthalic acid and a lower alkanethiolic acid.

The reaction of this invention, the dehydration of the 5-hydroxyl group to form 4-double bond is accomplished by the action of an acid or an inorganic oxyacid halide in the presence of a base. In this reaction, when an acid is used as a reagent the corresponding 6α-alkanoylthio-4-en-3-one steroids are obtained as the product. On the contrary, when an inorganic oxyacid halide in the presence of a base is used as a reagent, the corresponding 6β-alkanoylthio-4-en-3-one steroids are obtained as the products. By further studies, it was confirmed that the later product, 6β-epimer is very easily converted to the former product, but 6α-epimer transforms preferably in the presence of an acid. Therefore, the former product can also be synthesized by the successive treatment with an inorganic oxyacid halide in the presence of a base and with an acid. As for the acids to be used in the 6α-epimer formation from the starting materials or from the 6β-epimers thereof, most organic and inorganic acids are generally applicable; e.g., hydrochloric acid, sulfuric acid, phosphoric acid, methanesulfonic acid, p-toluenesulfonic acid, formic acid, tartaric acid and acetic acid. As the inorganic oxyacid halides, oxyacid halides of sulfur and phosphorous as thionyl halides and phosphoryl halides are applicable, wherein the halides are the chloride, bromide or iodide. As the base to be used with the inorganic oxyacid halides, organic tertiary amines such as pyridine, trialkylamines such as trimethylamine and triethylamine, and dimethylaniline are applicable. The reaction with acid is performed in a solvent or in a mixture of several solvents, preferably of high dielectric constants, e.g., an organic acid such as acetic acid (glacial), an alkylated amide such as dimethylformamide or other polar solvents such as acetone, dioxane and tetrahydrofuran. The reaction may be completed in a short time, particularly within between several minutes to several hours, by the application of strong conditions such as the use dry hydrogen chloride in acetic acid or more slowly, particularly within 1 or 2 days by the use of a weaker acid. The reaction with the inorganic oxyacid halide in the presence of a base cited above proceeded much more quickly, and completes often within several minutes at a lower (about 0° C.) temperature. In the reaction with the inorganic oxyacid halide, the dehydration of the other hydroxyl group than 5α-hydroxyl is often observed, for example, 17-hydroxyl to 16(17)-ene compound. In such cases, it can be preferably treated to protect such functions e.g., hydroxyl or oxo group by the proper conventional protection methods e.g., esterification, acetonidation or acetalation. Other examples of protective conversions will be properly designated by one skilled in the art to which this invention pertains.

Another process of this invention comprises reacting the starting material of the partial formula:

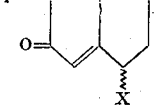

(V)

wherein X represents a halogen atom, which represents positions 3, 4, 5, 6 and 7 of the steroid molecule, with a salt of thiolalkanoic acid. As for the halogen atom represented by X, chlorine, bromine and iodine are exemplified. Of the starting material of this process, a compound of the formula:

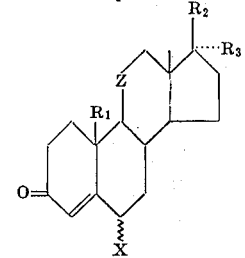

(VI)

wherein X represents a halogen atom; $R_1$ is hydrogen atom or methyl group; $R_2$ is hydroxyl group, OAc group or a 17-side chain of the pregnane or cholestane series, and $R_3$ is hydrogen, hydroxyl or an ethynyl; or when combined together, $R_2$ and $R_3$ represent oxygen atom; Z is methylene group or carbonyl group, are important. Examples of the starting material of this process involve: 6α-iodo-4-androstene-3,17-dione, 6β-iodo-4-androstene-3,17-dione, 6α-bromo-4-androstene-3,17-dione, 6β-bromo-4-androstene-3,17-dione, 6α- and 6β-chloro-4-androstene-3,17-diones, 6α- and 6β-bromo-17β-acetyloxy-4-androsten-3-ones, 6α- and 6β-iodo-17β-propionyloxy-4-androsten-3-ones, 6α- and 6β-bromo-17β-propionyloxy-4-androsten-3-ones, 6α- and 6β-bromo-17β-hydroxy-4-androsten-3-ones, 6α- and 6β-iodo-17β-hydroxy-4-androsten-3-ones, 6α- and 6β-bromo-17β-acetyloxy-4-estren-3-ones, 6α- and 6β-iodo-17β-hydroxy-4-estren-3-ones, 6α- and 6β-bromo-17β-hydroxy-4-estren-3-ones, 6α- and 6β-bromo-17β-butyryloxy-4-estren-3-ones, 6α- and 6β-bromo-17β-caproyloxy-4-estren-3-ones, 6α- and 6β-bromo-17α-ethynyl-17β-hydroxy-4-androsten-3-ones, 6α- and 6β-iodo-17α-ethynyl-17β-hydroxy-4-estren-3-ones, 6α- and 6β-bromo-17α-ethynyl-17β-acetyloxy-4-estren-3-ones, 6α- and 6β-iodo-4-pregnene-3,20-diones, 6α- and 6β-bromo-4-pregnene-3,20-diones, 6α- and 6β-bromo-17α-hydroxy-4-pregnene-3,20-diones, 6α- and 6β-bromo-4-cholesten-3-ones, 6α- and 6β-chloro-4-cholesten-3-ones, 6α- and 6β-bromo-17,21-dihydroxy-4-pregnene-3,20-diones and their ester and/or acetal derivatives, 6α- and 6β-bromo-17α,21-dihydroxy-4-pregnene-3,11,20-triones and their ester and/or acetal derivatives, and the like.

The reaction of this process, the substitution of the 6-halogeno residue with acylthio group is accomplished by the action of a salt of alkanethiolic acid, preferably in the presence of solvent. The reaction may be carried out at cooled or elevated temperature. As for the alkanethiolic acid salts utilized in this process, there is exemplified by salts of thiolacetic acid, thiolformic acid, thiolpropionic acid, thiolbutyric acid, thiolvaleric acid, thiolisovaleric acid, thiolcaproic acid, thiolenanthoic acid, thiolcaproic acid and the like. The salts may be alkalimetal salts such as sodium, potassium, lithium salts or may be alkali earth salts such as magnesium or calcium salts or may be organic ammonium salts such as trimethylammonium salts, triethylammonium salts, etc. The preferable solvent includes dimethylformamide, acetone, acetonitrile, dimethylsulfoxide, tetrahydrofuran, dioxane and the like.

The compound of the present invention, especially those represented by the general formula II shows many remarkable hormone activities such as antiestrogenic high potency without other ill side effects (useful for therapeutics for uterine breeding, and so on, such as pituitary gonadotrophin inhibition activity), useful for controlling agents for diseases of menopause and for hypergonadism or precocious puberty, and useful for ovulation-inhibition agents or contraceptive agents. They are also useful as important and essential intermediates of thieno-[4', 3', 2'-4,5,6]steroids bearing marked hormonal activities such as specific antiprogesteronic, antideciduomatogenic high potency useful for antifertilizing agent, which can be prepared by reaction of the products and a base. In the application of the products of the invention, both of the two epimers, 6α- and 6β-compounds, can be practically used as a medicine and as an intermediate.

The following examples are given to show the embodiment of the present invention. Many variations thereof may be possible without departing from the claims of the invention. Abbreviations are those conventional.

EXAMPLE 1

To a solution of 5α-hydroxy-6β-acetylthio-5α-androstane-3,17-dione (2.00 g.) in pyridine (60 ml.), there is dropwise added thionyl chloride (1.00 g.) while cooling with a mixture of sodium chloride and ice, and the resultant mixture is stirred for 10 minutes under the same condition. After decomposition of excess of the reagent with ice, the reaction mixture is shaken with ether. The ether layer is separated, washed with water and dried. After removal of the solvent, the residue is crystallized from a mixture of acetone and hexane to give 6β-acetylthio-4-androstene-3,17-dione (1.42 g.) as crystals melting at 170° to 171° C. $[\alpha]_D^{23}+298.8\pm2°$ (c=1.005, chloroform). UV-Spectrum: $\lambda_{max.}^{ethanol}$ 237 mμ (ε 15,820). IR-Spectrum: $\nu_{max.}^{chloroform}$ 1,737, 1,689, 1,678, 1,617, 1,117 cm.$^{-1}$. Anal. Calcd. for $C_{21}H_{28}O_3S$: C, 69.96; H, 7.83; S, 8.89. Found: C, 70.30; H, 7.97; S, 8.82.

The starting material of this example, 5α-hydroxy-6β-acetylthio-5α-androstane-3,17-dione, is prepared from 5α,6α-epoxy-5α-androstane-3,17-dione [Campbell et al.: J. Am. Chem. Soc., Vol. 80, p. 4,717 (1958)] by treatment with thiolacetic acid at room temperature.

EXAMPLE 2

To a solution of 5α-hydroxy-6β-acetylthio-5α-androstane-3,17-dione (0.59 g.) in glacial acetic acid (20 ml.), dry hydrogen chloride is passed through for 45 minutes. The reaction mixture is combined with water and extracted with ether. The ether extract is washed with water and the solvent evaporated to give 6α-acetylthio-4-androstene-3,17-dione (0.55 g.) as a crude oil. IR-Spectrum: $\nu_{max.}^{chloroform}$ 1,736, 1,688, 1,679, 1,616, 1,125 cm.$^{-1}$.

EXAMPLE 3

5α-Hydroxy-6β-acetylthio-5α-androstane-3,17-dione is reacted with thionyl chloride in pyridine as in example 1 whereby 6β-acetylthio-4-androstene-3,17-dione is produced.

The product of this example (1.24 g.), glacial acetic acid (25 ml.) and p-toluenesulfonic acid monohydrate (0.21 g.) is allowed to stand at room temperature (10° to 30° C.) for 48 hours. The reaction mixture is combined with water and shaken with ether. The ether layer is separated, washed with water, dilute sodium carbonate solution and water in order and dried over anhydrous sodium sulfate. After removal of the solvent by evaporation, the residue is chromatographed on activated magnesium silicate. The middle fraction eluted with petroleum ether-benzene is concentrated to give 6α-acetylthio-4-androstene-3,17-dione (0.68 g.) as a crude oil.

EXAMPLE 4

To a solution of 5α-hydroxy-6β-acetylthio-17β-acetyloxy-5α-androstan-3-one (6.53 g.) in pyridine (65 ml.), there is dropwise added thionyl chloride (4 ml.) while stirring at 0° C. After 5 minutes, the reaction mixture is poured into a mixture of ice and water and then shaken with chloroform. The chloroform layer is separated, washed with dilute hydrochloric acid solution and water in order and dried. After removal of the solvent by evaporation, the residue (4.75 g.) is crystallized from a mixture of acetone and hexane to give crystals (2.55 g.). The mother liquor of crystallization is concentrated and chromatographed on activated magnesium silicate. From the eluates with benzene and benzene-ether, there are obtained additional crystals (0.21 g.). The crystals are combined together and recrystallized from a mixture of ether and petroleum ether to give 6β-acetylthio-17β-acetyloxy-4-androsten-3-one (2.59 g.) as pure crystals melting at 144° to 145° C. $[\alpha]_D^{24}+186,5\pm2°$ (c=1.026, chloroform). UV-Spectrum: $\lambda_{max.}^{ethanol}$ 237 mμ (ε 15,960). IR-Spectrum: $\nu_{max.}^{CCl_4}$ 1,740, 1,698, 1,683, 1,614, 1,243, 1,132, 1,046, 1,040 cm.$^{-1}$. Anal. Calcd. For $C_{23}H_{32}O_4S$: C, 68.28; H, 7.97; S, 7.93. Found: C, 68.54; H, 8.04; S, 7.82.

The starting material of this example, 5α-hydroxy-6β-acetylthio-17β-acetyloxy-5α-androstan-3-one, is prepared from 3,3-ethylenedioxy-5α,6α-epoxy-17β-acetyloxy-5α-androstane [Ringold et al.: Tetrahedron, Vol. 7, p. 138 (1959)] by treatment with thiolacetic acid at room temperature, followed by refluxing with acetic acid.

EXAMPLE 5

To a solution of 5α-hydroxy-6β-acetylthio-17β-acetyloxy-5α-androstan-3-one (1.00 g.) in glacial acetic acid (30 ml.) dry hydrogen chloride is passed through for 1 hour. The reaction mixture is combined with water and extracted with ether. The ether extract is washed with water and the solvent evaporated. The residue (0.93 g.) is chromatographed on activated magnesium silicate (30 g.). The fractions eluted with benzene and benzene-ether (9:1–8:2) are combined together, concentrated and crystallized from methanol to give 6α-acetylthio-17β-acetyloxy-4-androsten-3-one (0.50 g.) as crystals melting at 192° to 194° C. $[\alpha]_D^{22.5}+40.3\pm2°$ (c=1.016, chloroform). UV-Spectrum: $\lambda_{max.}^{ethanol}$ 235 mμ (ε 16,820). IR-Spectrum: $\nu_{max.}^{CCl_4}$ 1,741, 1,687, 1,618, 1,244, 1,134, 1,044, 1,016 cm.$^{-1}$. Anal. Calcd. for $C_{23}H_{32}O_4S$: C, 68.28; H, 7.97; S, 7.93. Found: C, 68.39; H, 8.10, S, 7.89.

EXAMPLE 6

5α-Hydroxy-6β-acetylthio-17β-acetyloxy-5α-androstan-3-one is reacted with thionyl chloride in pyridine as in example 4 whereby 6β-acetylthio-17β-acetyloxy-4-androsten-3-one is produced.

The product, 6β-acetylthio-17β-acetyloxy-4-androsten-3-one (2.76 g.) is dissolved in a mixture of p-toluenesulfonic acid monohydrate (0.60 g.) and glacial acetic acid (30 ml.) and the resultant solution is allowed to stand at room temperature (10° to 30° C.) for 48 hours. The reaction mixture is combined with water and shaken with ether. The ether layer is separated, washed with water and dilute sodium carbonate solution in order and dried. After removal of the solvent by evaporation, the residue is chromatographed on activated magnesium silicate (60 g.). The fractions eluted with benzene and benzene-ether (9:1–4:1) are combined together, concentrated and crystallized from methanol to give 6α-acetylthio-17β-acetyloxy-4-androsten-3-one (1.15 g.) as crystals melting at 192° to 194° C.

EXAMPLE 7

To a solution of 5α-hydroxy-6β-acetylthio-5α-cholestan-3-one (1.44 g.) in pyridine (14 ml.) there is dropwise added thionyl chloride (0.70 ml.) at 0° C. while stirring. After 10 minutes, the reaction mixture is poured into a mixture of ice and water and shaken with a mixture of ether and benzene. The organic solvent layer is washed with water, dried and concentrated. The resultant oil (1.15 g.) is crystallized from petroleum ether and recrystallized from methanol to give 6β- acetylthio-4-cholesten-3-one (0.92 g.) as crystals melting at 106° to 107° C. $[\alpha]_D^{20}$+168.5±3° (c=0.874, chloroform). UV-Spectrum: $\lambda_{max}^{ethanol}$ 240 mμ (ε 15,320). IR-Spectrum: $\nu_{max}^{Nujol}$ 1693, 1672, 1612, 1124 cm⁻¹. Anal. Calcd. for $C_{29}H_{46}O_2S$; C, 75.93; H, 10.11; S, 6.99. Found C, 76.13; H, 10.20; S, 6.93.

EXAMPLE 8

To a solution of 5α-hydroxy-6β-acetylthio-5α-cholestan-3-one (0.32 g.) in glacial acetic acid (15 ml.) there is added p-toluenesulfonic acid monohydrate (0.10 g.), and the resultant mixture is allowed to stand at room temperature (10° to 30° C.) overnight. The reaction mixture is combined with water and shaken with a mixture of ether and benzene. The organic solvent layer is washed with water and dilute sodium carbonate solution in order, dried and concentrated. The resultant oil is purified on chromatography with activated magnesium silicate whereby 6α-acetylthio-4-cholesten-3-one (0.23 g.) is obtained as an oil. UV-Spectrum: $\lambda_{max}^{ethanol}$ 235 μ.

Cyclization of the product with alumina affords 5'-methylthieno[4',3',2'-4,5,6]-5-cholesten-3-one as crystals melting at 131° to 132° C.

EXAMPLE 9

5α-Hydroxy-6β-acetylthio-5α-cholestan-3-one is reacted with thionyl chloride in pyridine as in example 8 whereby 6β-acetylthio-4-cholesten-3-one is produced.

To a solution of the product, 6β-acetylthio-4-cholesten-3-one (0.10 g.) in glacial acetic acid (10 ml.) there is added p-toluenesulfonic acid monohydrate (0.05 g.), and the resultant mixture is allowed to stand at room temperature (10° to 30° C.) over night. The reaction mixture is shaken with a mixture of ether and benzene. The organic solvent layer is washed with water and dilute sodium carbonate solution in order, dried and concentrated. The resultant oil is chromatographed over activated magnesium silicate for purification to give 6α-acetylthio-4-cholesten-3-one (0.08 g.) as an oil.

EXAMPLE 10

To a solution of 5α-hydroxy-6β-acetylthio-5α-pregnane-3,20-dione (2.00 g.) in pyridine (20 ml.) there is dropwise added thionyl chloride (1 ml.), and the resultant mixture is stirred for 5 minutes at 0° C. The reaction mixture is poured into a mixture of ice and water and shaken with chloroform. The organic solvent layer is washed with water, dried and concentrated to dryness. The residue is crystallized from methanol to give 6β-acetylthio-4-pregnene-3,20-dione (1.25 g.) as crystals melting at 185° to 187° C. $[\alpha]_D^{25}$+243±2° (c= 1.060, chloroform). UV-Spectrum: $\lambda_{max}^{ethanol}$ 238 mμ (ε 15,140). IR-Spectrum: $\nu_{max}^{Nujol}$ 1695, 1660, 1611, 1118 cm.⁻¹. Anal. Calcd. for $C_{23}H_{32}O_3S$: C, 71.09; H, 8.30; S, 8.25. Found: C, 71.54; H, 8.46; S, 8.07.

EXAMPLE 11

To a solution of 5α-hydroxy-6β-acetylthio-5α-pregnane-3,20-dione (0.30 g.) in glacial acetic acid (15 ml.) dry hydrogen chloride is passed through for 1 hour. The resulting mixture is allowed to stand at room temperature (10° to 30° C.) overnight. The reaction mixture is combined with water and shaken with ether. The ether layer is separated, washed with water, dilute sodium carbonate solution and water in order, dried and concentrated to give 6α-acetylthio-4-pregnene-3,20-dione (0.24 g.) as a crude oil. UV-Spectrum: $\lambda_{max}^{ethanol}$ 236 μ.

Cyclization of the product with alumina affords corresponding thienopregnene compound melting at 163° to 164° C.

EXAMPLE 12

5α-Hydroxy-6β-acetylthio-5α-pregnane-3,20-dione is reacted with thionyl chloride in pyridine as in example 11 whereby 6β-acetylthio-4-pregnene-3,20-dione is produced.

To a solution of the product, 6β-acetylthio-4-pregnene-3,20-dione(1.02 g.) in glacial acetic acid (30 ml.) dry hydrogen chloride is passed through for 30 minutes. The reaction mixture is combined with water and shaken with ether. The ether layer is separated, washed with water, dilute sodium carbonate solution and water, dried and concentrated to give 6α-acetylthio-4-pregnene-3,20-dione (0.88 g.) as an oil.

EXAMPLE 13

To a solution of 5α,17α-dihydroxy-6β-acetylthio-5α-pregnane-3,20-dione (0.83 g.) in glacial acetic acid (15 ml.) dry hydrogen chloride is passed through for 20 minutes while cooling with ice, and the resultant mixture is allowed to stand for 10 minutes under the same condition. The reaction mixture is combined with water and shaken with ether. The ether layer is separated, washed with water, dilute sodium carbonate solution and water in order, dried over anhydrous sodium sulfate and concentrated to dryness to give 6α-acetylthio-17α-hydroxy-4-pregnene-3,20-dione (0.81 g.) as an oil.

The product is cyclized with sodium ethoxide to afford methylthieno[4'Γ',2'-4,5,6]-5-pregnene-3,20-dione melting at 240° to 242° C.

The starting material of this example, 5α,17α-dihydroxy-6β-acetylthio-5α-pregnane-3,20-dione, is prepared from 3,3:20,20-bisethylenedioxy-5α,6α-epoxy-17α-hydroxy-5α-pregnane [Babcock et al.: J. Am. Chem. Soc., Vol. 80, p. 2,904 (1958)] by treatment with thiolacetic acid at room temperature followed by refluxing with acetic acid.

EXAMPLE 14

To a solution of 5α,17β-dihydroxy-6β-acetylthio-17α-ethynyl-5α-estran-3-one (0.33 g.) in glacial acetic acid (10 ml.) there is passed through dry hydrogen chloride for 2 hours. The reaction mixture is combined with water and shaken with ether. The ether layer is separated, washed with water, dilute sodium carbonate solution and water in order, dried over anhydrous sodium sulfate and evaporated to dryness to give 6α-acetylthio-17β-hydroxy-17α-ethynyl-4-estren-3-one (0.31 g.) as an oil. IR-Spectra: $\nu_{max}^{Nujol}$ 3,400, 3,275, 1,715, 1,683, 1,618, 1,130 cm.⁻¹; $\nu_{max}^{CCl_4}$ 3,626, 3,286, 1,700, 1,687, 1,622, 1,130 cm.⁻¹.

The starting material of this example, 5α,17β-dihydroxy-6β-acetylthio-17α-ethynyl-5α-estran-3-one, is prepared from 5α,6α-epoxy-17α-ethynyl-5α-estrane-3β,17β-diol [Ringold et al.: J. Am. Chem. Soc., Vol. 81, p. 436 (1959)] by treatment with thiolacetic acid at room temperature, followed by oxidation with chromium trioxide in acetone in the presence of sulfuric acid.

EXAMPLE 15

To a solution of 6β-bromoprogesterone (0.56 g.) in acetone (25 ml.) there is added potassium thiolacetate (0.33 g.), and the resultant mixture is stirred for 4 hours, at room temperature (10° to 30° C.). The reaction mixture is combined with water and shaken with ether. The ether layer is separated, washed with water, dried and concentrated to give 6α-acetylthio-4-pregnene-3,20-dione (0.45 g.) as an oil.

The starting material of this example, 6β-bromoprogesterone, is known [Ringold et al.: U.S. Pat. No. 3,036,096].

EXAMPLE 16

To a solution of 6β-bromo-17β-acetyloxy-4-androsten-3one (2.24 g.) in acetone (60 ml.), there is added potassium thiolacetate (1.26 g.), and the resultant mixture is stirred for 4 hours at room temperature (10° to 30° C.). The reaction mixture is combined with water and shaken with a mixture of ether and chloroform (4:1). The organic solvent layer is separated, washed with dilute sodium carbonate solution and water in order, dried over anhydrous sodium sulfate and concentrated. The residue is crystallized from a mixture of ether and petroleum ether to give 6α-acetylthio-17β-acetyloxy-4-androsten-3-one (1.37 g.) as crystals melting at 192° to 194° C. The mother liquor of crystallization is purified by chromatography on activated magnesium silicate to give additional crystals (0.27 g.) of the same substance.

The starting materials of this example, 6β-bromo-17β-acetyloxy-4-androsten-3-one, is prepared from testosterone acetate by treatment with N-bromosuccinimide in carbon tetrachloride.

EXAMPLE 17

To a solution of 6β-bromo-17β-propionyloxy-4-androsten-3-one (0.93 g.) in dimethylformamide (20 ml.), there is added potassium thiolacetate (0.80 g.), and the resultant mixture is stirred for 30 minutes at room temperature (10° to 30° C.). The reaction mixture is combined with water and shaken with a mixture of ether and dichloromethane (4:1). The organic solvent layer is washed with water, dried over anhydrous sodium sulfate and concentrated. The residue is crystallized from a mixture of ether and petroleum ether and recrystallized from methanol to give 6α-acetylthio-17β-propionyloxy-4-androsten-3-one (0.71 g.) as crystals melting at 151° to 153° C. $[\alpha]_D^{23} +40.9 \pm 2°$ (c=1.006, chloroform). UV–Spectrum: $\lambda_{max.}^{ethanol}$ 235.5 mµ (ε 16,200). IR–Spectrum: $\nu_{max.}^{"Nujol"}$ 1,731, 1,696, 1,675, 1,610, 1,190, 1,130 cm.$^{-1}$. Anal. Calcd. for $C_{24}H_{34}O_4S$: C, 68.86; H, 8.19; S, 7.66. Found: C, 68.71; H, 8.21; S, 7.79.

The starting material of this example is prepared from testosterone propionate by bromination with N-bromosuccinimide.

EXAMPLE 18

To a solution of 6β-bromo-17β-acetyloxy-4-estren-3-one (1.14 g.) in acetone (40 ml.), there is added potassium thiolacetate (0.67 g.), and the resultant mixture is stirred for 4 hours at room temperature (10° to 30° C.). The reaction mixture is combined with water and shaken with ether. The ether layer is washed with water, dried over anhydrous sodium sulfate and concentrated. The residue is chromatographed on activated magnesium silicate. The fraction eluted with benzene-ether (9:1–1:1) is concentrated to give 6β-acetylthio-17β-acetyloxy-4-estren-3-one(1.00 g.) as an oil. IR–Spectrum: $\nu_{max.}^{CCl_4}$ 1,746, 1,696(shoulder), 1,688, 1,626, 1,138, 1,250 cm.$^{-1}$.

The starting material of this example, 6β-bromo-17β-acetyloxy-4-estren-3-one, is prepared from 3,17-diacetyloxy-3,5-estradiene [Velluz et al.: French Pat. No. 1,180,907] by treatment with N-bromoacetamide and sodium acetate in refluxing acetic acid.

EXAMPLE 19

To a solution of 6β-bromo-17β-acetyloxy-17α-ethynyl-4-estren-3-one (0.80 g.) in acetone (30 ml.), there is added potassium thiolacetate (0.78 g.), and the resultant mixture is allowed to stand at room temperature (10° to 30° C.) for 2.5 hours. The reaction mixture is combined with water and shaken with ether. The ether layer is separated, washed with water, dried and concentrated. The residue is crystallized from ether to give crystals (0.34 g.). The mother liquor of crystallization is concentrated and chromatographed on activated magnesium silicate. The fraction eluted with ether-benzene is concentrated and crystallized from a mixture of acetone and hexane to give 6α-acetylthio-17β-acetyloxy-17α-ethynyl-4-estren-3-one (0.42 g.) as crystals melting at 216° to 219° c.(decomp.). $[\alpha]_D^{23.5}$ −34.4±2° (c=0.999, chloroform). UV–Spectrum: $\lambda_{max.}^{ethanol}$ 235.5 mµ (ε17,343). IR–Spectrum: $\nu_{max.}^{chloroform}$ 3,300, 1,742, 1,690(shoulder), 1,674, 1,623, 1,260, 1,134, 1,120, 1,022 cm.$^{-1}$. Anal. Calcd. for $C_{24}H_{30}O_4S$: C, 69.53; H, 7.29; S, 7.74. Found: C, 69.54; H, 7.35; s, 7.86.

EXAMPLE 20

To a solution of 6β-bromo-17β-hydroxy-17α-ethynyl-4-estren-3-one (4.57 g.) in acetone (70 ml.), there is added potassium thiolacetate (2.80 g.), and the resultant mixture is stirred for 3 hours at room temperature (10° to 30° C.). The reaction mixture is combined with water and shaken with ether. The ether layer is separated, washed with water, dried over anhydrous sodium sulfate and concentrated to give 6α-acetylthio-17β-hydroxy-17α-ethynyl-4-estren-3-one (1.44 g.) as an oil. IR–Spectrum: $\nu_{max.}^{CCl_4}$ 3,626, 3,286, 1,700, 1,687, 1,622, 1,130 cm.$^{-1}$.

The starting material of this example, 6β-bromo-17β-hydroxy-17α-ethynyl-4-estren-3-one, is prepared from 3-ethoxy-17β-hydroxy-17α-ethynyl-3,5-estradiene [Knox et al.: J. Am. Chem. Soc., Vol. 82, p. 1,230 (1960)] by treatment with N-bromosuccinimide in acetone in the presence of sodium acetate.

EXAMPLE 21

To a mixture of 6β-bromo-17,20:20,21-bismethylenedioxy-4-pregnen-3-one (3.33 g.) in dimethylformamide (40 ml.), there is added potassium thiolacetate (1.70 g.), and the resultant mixture is stirred at room temperature (10° to 30° C.) for 4 hours. The reaction mixture is combined with water. The precipitate is collected by filtration, washed water and dried to give 6α-acetylthio-17,20:20,21-bismethylenedioxy-4-pregnen-3-one (2.98 g.). IR–Spectrum: $\nu_{max.}^{CCl_4}$ 1,701, 1,684, 1,611, 1,133, 1,103, 1,088 cm.$^{-1}$.

The starting material of this example, 6β-bromo-17,20:20,21-bismethylenedioxy-4-pregnen-3-one, is prepared from 17,20:20,21-bismethylenedioxy-4-pregnen-3-one [Beyler et al.: J. Org. Chem., Vol. 26, p. 2,421 (1961)] by treatment with N-bromosuccinimide in carbon tetrachloride under irradiation of light.

EXAMPLE 22

To a solution of 6β-bromo-17,20:20,21-bismethylenedioxy-4-pregnene-3,11-dione (3.42 g.) in dimethylformamide (40 ml.), there is added potassium thiolacetate (1.62 g.), and the resultant mixture is stirred at room temperature (10° to 30° C.) for 5 hours. Reaction mixture is combined with water. The precipitate is collected by filtration, crystallized from a mixture of acetone and hexene and recrystallized from a mixture of dichloromethane and methanol to give 6α-acetylthio-17,20:20,21-bismethylenedioxy-4-pregnene-3,11-dione (2.43 g.) as crystals melting at 234° to 236° C. $[\alpha]_D^{23.5}$+140.3±2° (c=0.965, chloroform). IR–Spectrum: $\nu_{max.}^{"Nujol"}$ 1,690, 1,675, 1,609, 1,135, 1,098, 1,081 cm.$^{-1}$.

I claim:

1. A compound of the formula

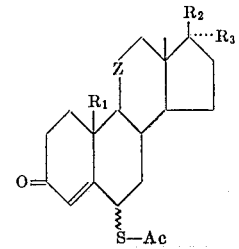

wherein Ac is a lower alkanoyl group, $R_1$ is hydrogen or methyl, $R_2$ is a hydroxy, O-Ac, acetyl, hydroxyacetyl or a 17-side chain of the cholestane series, $R_3$ is hydrogen, hydroxy, lower alkyl, lower alkenyl or lower alkynyl, or when combined together $R_2$ and $R_3$ represent an oxygen atom or a group of the formula

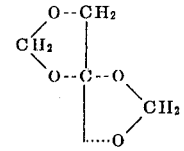

Z is methylene or carbonyl, and the mark ⌇ represents either the α or β-configuration.

2. A compound according to claim 1, wherein $R_1$ is methyl, $R_2$ and $R_3$ combined together represent oxo, Z is methylene and Ac is acetyl.

3. A compound according to claim 1, wherein $R_1$ is methyl, $R_2$ is hydroxy or lower alkanoyloxy, $R_3$ is hydrogen, Z is methylene and Ac is acetyl.

4. A compound according to claim 1, wherein $R_1$ is methyl, $R_2$ is acetyl, $R_3$ is hydrogen, hydroxy or acyloxy, Z is methylene and Ac is acetyl.

5. A compound according to claim 1, wherein $R_1$ is methyl, $R_2$ and $R_3$ combined together represent a group of the formula

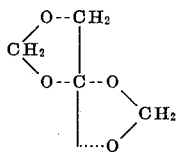

Z is carbonyl or methylene and Ac is acetyl.

6. A compound according to claim 1, wherein $R_1$ is hydrogen, $R_2$ is hydroxy or lower alkanoyloxy, $R_3$ is hydrogen or ethynyl, Z is methylene and Ac is acetyl.

A compound according to claim 1, wherein $R_1$ is methyl, $R_2$ is the cholestane side chain, $R_3$ is hydrogen, Z is methylene and Ac is acetyl.

8. A process for preparing a compound as claimed in claim 1, which comprises reacting a steroid compound having the partial formula

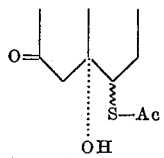

wherein Ac is a lower alkanoyl group and the mark ⌇ represents either the α or β-configuration, with a dehydrating agent.

9. A process for preparing a compound as claimed in claim 1, which comprises reacting a steroid compound having the partial formula

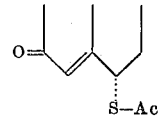

wherein X is a halogen atom and the mark ⌇ represents either the α or β-configuration, with a salt of a thiol-lower alkanoic acid.

10. A process for preparing a compound as claimed in claim 1, namely a compound having the partial formula

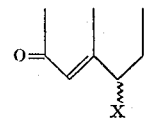

wherein Ac is a lower alkanoyl group, which comprises reacting a compound having the partial formula

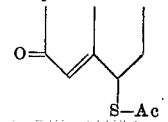

wherein Ac is defined as above, with an organic or inorganic acid.

11. A process according to claim 8 wherein the dehydrating agent is an acid or an inorganic oxyacid halide.

12. A process according to claim 8 wherein the dehydrating agent is thionyl chloride in pyridine.

13. A process according to claim 8 wherein the dehydrating agent is hydrogen chloride in acetic acid.

14. A process according to claim 9, wherein the salt of a thiol-lower alkanoic acid is potassium thiolacetate in acetone or dimethylformamide.

15. A process according to claim 9, wherein the organic or inorganic acid is selected from hydrochloric acid and p-toluenesulfonic acid.

* * * * *